United States Patent [19]
Ureel

[11] Patent Number: 5,273,302
[45] Date of Patent: Dec. 28, 1993

[54] ADJUSTABLE BICYCLE STEM

[76] Inventor: Jeffrey M. Ureel, 18412 Devonshire, Birmingham, Mich. 48025

[21] Appl. No.: 844,835

[22] Filed: Mar. 3, 1992

[51] Int. Cl.$^5$ .............................................. B62K 21/16
[52] U.S. Cl. ................................ 280/279; 280/288.4; 74/551.1; 74/551.3
[58] Field of Search ................ 280/263, 270, 274, 278, 280/280, 288.4, 775, 778, 287, 279; 74/551.1, 551.3, 551.4, 551.5, 551.7

[56] References Cited

U.S. PATENT DOCUMENTS

| | | | |
|---|---|---|---|
| 511,479 | 12/1893 | Westbrook | 74/551.4 |
| 647,366 | 4/1900 | Blaker | 74/551.4 |
| 671,647 | 4/1901 | Field | 74/551.6 |
| 689,217 | 12/1901 | Palmer | 74/551.3 |
| 909,633 | 1/1909 | Mead | 74/551.6 |
| 2,414,275 | 1/1947 | Schwinn | 74/551.4 |
| 3,481,218 | 12/1969 | Yoshikawa | 74/551.3 |
| 3,863,521 | 2/1975 | Gatsos et al. | 74/551.4 |
| 4,023,436 | 5/1977 | Dodge | 74/551.3 |
| 4,417,745 | 11/1983 | Shomo | 280/287 |
| 4,729,255 | 3/1988 | Moulton | 74/551.3 |
| 4,939,950 | 7/1990 | Girvin | 74/551.2 |
| 5,133,224 | 7/1992 | Prins | 74/551.3 |
| 5,138,900 | 8/1992 | Hals | 74/551.3 |
| 5,186,074 | 2/1993 | Arnold | 74/551.1 |

FOREIGN PATENT DOCUMENTS 9003302  4/1990  World Int. Prop. O. ......... 74/551.3

OTHER PUBLICATIONS

Softride Brochure-SRS Front Suspension Stem, 1991.

Primary Examiner—Margaret A. Focarino
Assistant Examiner—Kevin Hurley
Attorney, Agent, or Firm—Basile and Hanlon

[57] ABSTRACT

An adjustable bicycle stem is disclosed for use on a bicycle having a handlebar and a stem sleeve. The bicycle stem comprises a substantially vertical member having a first end and a second end, the first end being removably receivable within the sleeve. A first substantially horizontal member is attached to the vertical member second end, and a second substantially horizontal member is pivotably connected to the first horizontal member. A mechanism is provided for pivoting the second horizontal member with respect to the first horizontal member. A mechanism is also provided for securing the handlebar to the second horizontal member.

17 Claims, 4 Drawing Sheets

ADJUSTABLE BICYCLE STEM

BACKGROUND OF THE INVENTION

1. Field of the Invention

The present invention relates generally to bicycle stems, and more particularly to a bicycle stem which is adjustable between a low, touring position, a high, mountain bike position, and many intermediate positions.

2. Description of the Relevant Art

Designers of bicycles, bicycle components and bicycle stems in particular are continually seeking new and improved systems adapted to permit ease of manufacture, as well as efficiency and comfort in use and handling. In order to be a useful, marketable and profitable venture, such a design should allow the full range of use as does any conventionally designed bicycle stem, yet should also be a versatile design, simple to mass produce, package and market.

Such conventionally designed bicycle stems are normally manufactured such that there can be only a limited amount of height adjustment. However, this limited amount will not vary the handlebar position from a touring position to a mountain bike position or anything intermediate those two positions. The manufacture of such bicycle stems would essentially necessitate a dedicated facility adapted to produce only one type of stem appropriate for either the touring bike or mountain bike, as desired. However, this dedication of resources is too costly a proposition in today's diversified and competitive business arena.

Another drawback associated with bicycles having stems only suited for either touring or mountain bikes, or any other one position, is that, on different occasions, the rider and/or the terrain may not be suited for that one type of handlebar configuration. In that event, the rider has only two options—purchase a different bicycle which would be suited for such terrain, or forego that opportunity to ride. The first solution is extremely cost prohibitive for most people and presents problems in storage; while the second solution cuts greatly into a rider's bicycling pleasure and enjoyment.

Thus, it would be desirable to provide one bicycle stem which can be adjusted into a position suitable for touring bikes, mountain bikes, stationary athletic bikes, or the like, without having to change the position and attitude of the handlebars. Further, it would be desirable to provide such an adjustable bicycle stem which allows for quick positioning for better control and comfort while riding without dismounting, and without needing any tools in order to adjust the stem. Still further, it would be desirable to provide such a stem which can be mounted on standard bicycle forks. It would also be desirable to provide an adjustable stem whereby the handlebars can be positioned for use by several members of one family, thus eliminating the need for a less avid bicycling family to purchase various bikes to fit an individual member's physique and preference.

SUMMARY OF THE INVENTION

The present invention addresses and solves all the problems enumerated above, by providing an adjustable bicycle stem for use on a bicycle having a handlebar and a stem sleeve. The bicycle stem comprises a substantially vertical member having a first end and a second end, the first end being removably receivable within the sleeve. A first substantially horizontal member is attached to the vertical member second end, and a second substantially horizontal member is pivotably connected to the first horizontal member. The present invention further comprises means for pivoting the second horizontal member with respect to the first horizontal member. Means are provided for securing the handlebar to the second horizontal member.

BRIEF DESCRIPTION OF THE DRAWINGS

Other objects and features of the present invention will become apparent by reference to the following detailed description and drawings, in which.

DETAILED DESCRIPTION OF THE PREFERRED EMBODIMENTS

Figure 1:
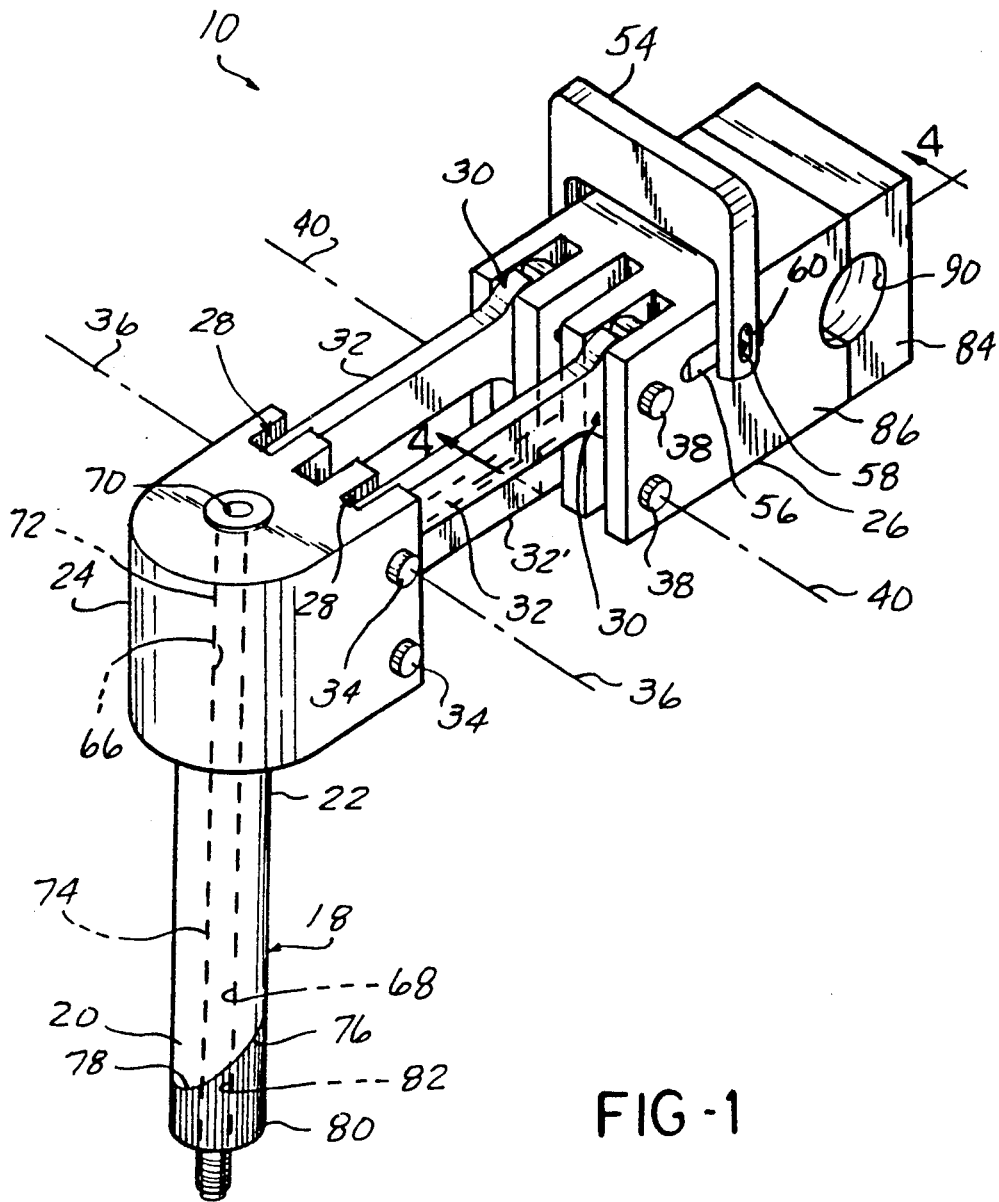
FIG. 1 is a perspective view of a first embodiment of the adjustable bicycle stem of the present invention.
Figure 3:
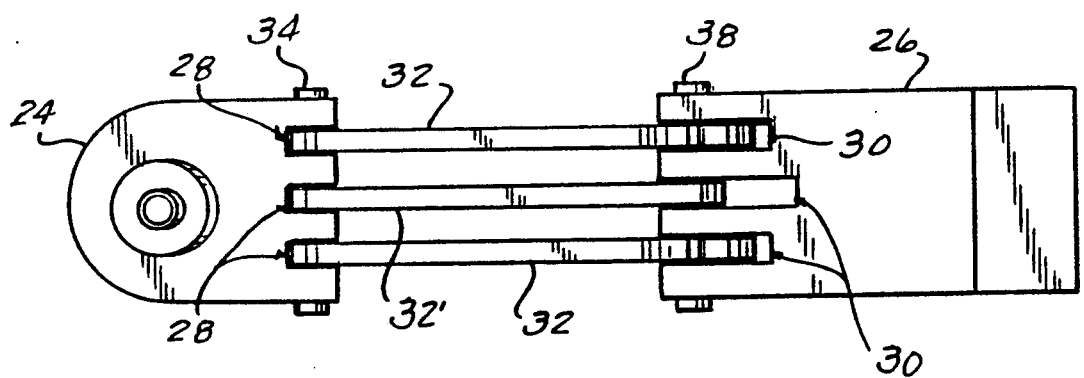
FIG. 3 is a bottom view of the present invention.
Figure 2:
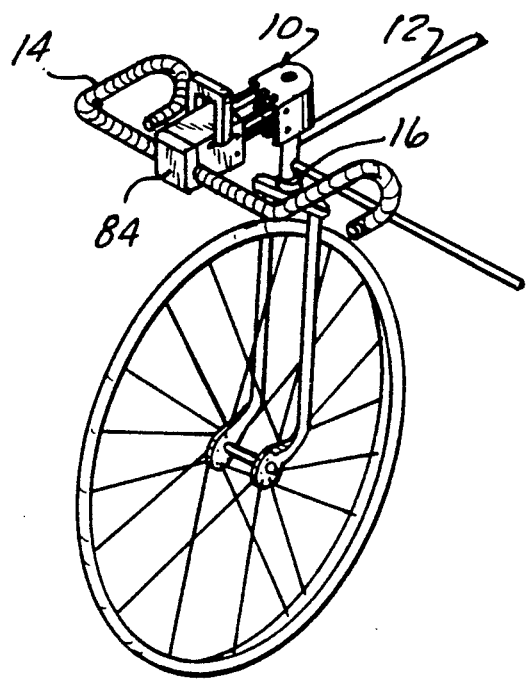
FIG. 2 is a cutaway perspective view of a bicycle with the bicycle stem mounted in place and with handle bars secured within the handle bar securing means.

Referring now to FIGS. 1 and 2, the adjustable bicycle stem of the present invention is designated generally as 10. Bicycle stem 10 is for use on a bicycle 12 having a handlebar 14 and a stem sleeve 16. Bicycle stem 10 comprises a substantially vertical member 18 having a first end 20 and a second end 22, with first end 20 being removably receivable within sleeve 16. A first substantially horizontal member 24 is attached to vertical member second end 22. A second substantially horizontal member is pivotably connected to first horizontal member 24.

The adjustable bicycle stem 10 of the present invention further comprises means for pivoting second horizontal member 26 with respect to first horizontal member 24. This pivoting means may comprise any suitable means, but in the preferred embodiment, this pivoting means comprises a first articulating joint 28 disposed on first horizontal member 24. A second articulating joint 30 is disposed on second horizontal member 26. A pivotable link 32 is formed between first joint 28 and second joint 30. The articulating joints 28, 30 may comprise any suitable joints, however in the preferred embodiment, the first articulating joint 28 comprises a tenon-mortise joint connected to the first horizontal member 24 by a pin 34 extending coaxially with a fixed pivot axis 36, the pivot axis 36 being fixed with respect to vertical member 18. The second articulating joint 30 may also comprise a tenon-mortise joint connected to second horizontal member 26 by a pin 38 extending coaxially along a movable pivot axis 40, the pivot axis 40 being movable relative to vertical member 18.

Any appropriate number of links 32 may be used as desired, and are contemplated as being within the scope of the present invention. However, in the preferred embodiment, three pivotable links 32 are formed between three pairs of first and second articulating joints, 28, 30, respectively. Without being bound to any theory, it is believed that the three bar linkage gives an optimum amount of height adjustment, i.e. approximately 4 to 5 inches of movement, and allows for smooth, continuous upward movement without any interference. A two-bar linkage is also contemplated, one link 32 being oriented above a second link 32. This configuration, however, gives only about 2 to 3 inches of movement, since, unlike in the three link configuration, movement would be limited at a certain point by one of the links abutting the other link.

Figure 5:
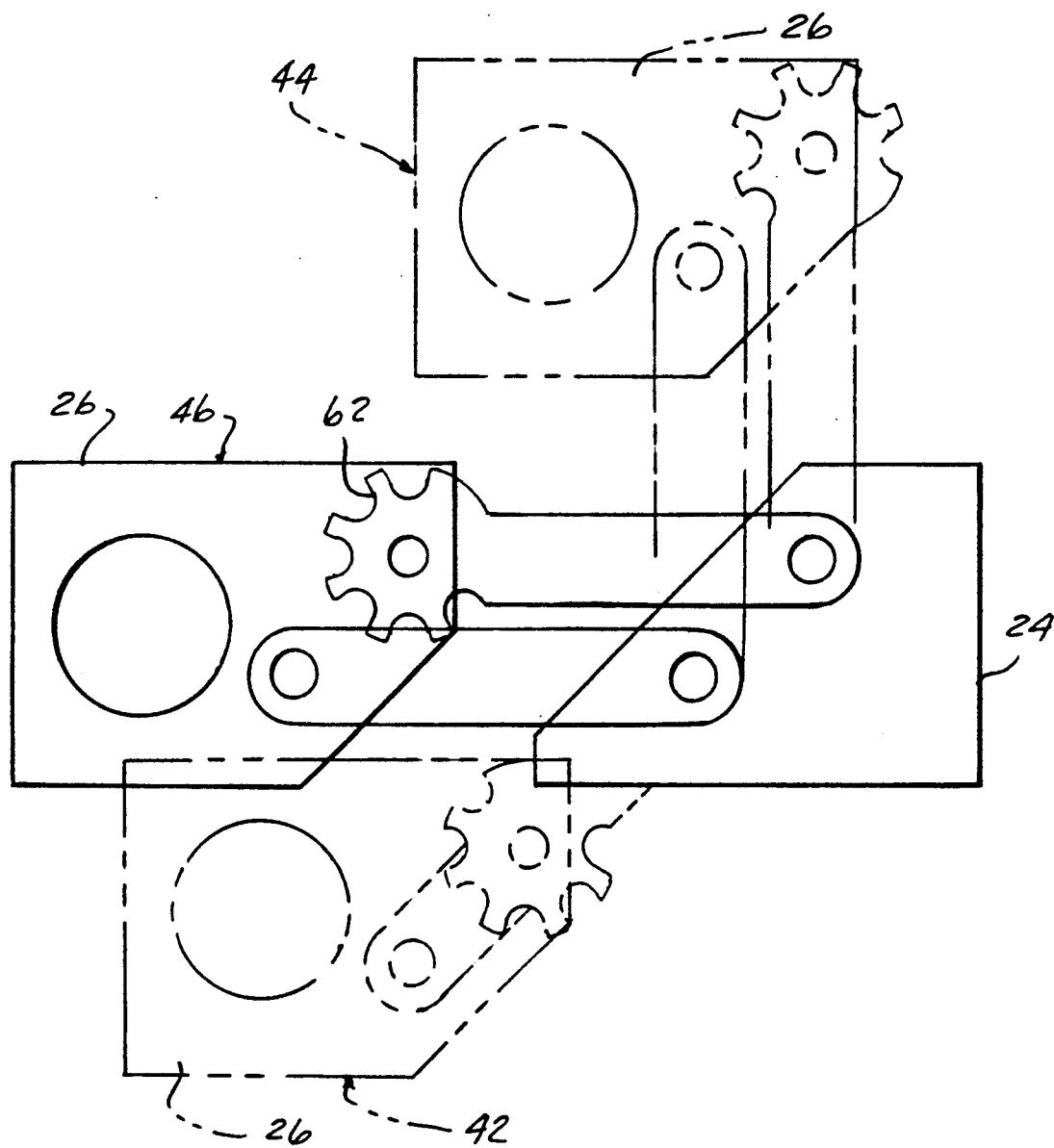
FIG. 5 is a schematic view showing a low, high and intermediate position of the adjustable bicycle stem.

Second horizontal member 26 may be movable between a low position 42, a high position 44 and one of a plurality of positions intermediate the low 42 and high 44 positions, one of which is designated 46, as best seen in the schematic view shown in FIG. 5. These positions are low, high or intermediate relative to first horizontal member 24.

Figure 8:
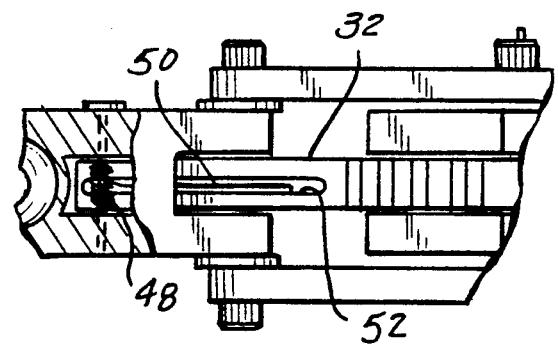
FIG. 8 is a cutaway bottom view of the second embodiment, partially cross sectioned, showing an optional spring for biasing the second horizontal member into a locked position.

The adjustable bicycle stem 10 may further optionally comprise means, acting upon pivotable link 32, for biasing second horizontal member 26 into one of the positions. This biasing means may comprise any suitable means, however, as best seen in FIG. 8, this means comprises a spring 48 loaded projection 50 slidably received within a recess 52 disposed on link 32. Projection 50 will urge link 32 into the next closest position if link 32 is in between two positions.

Figure 4:
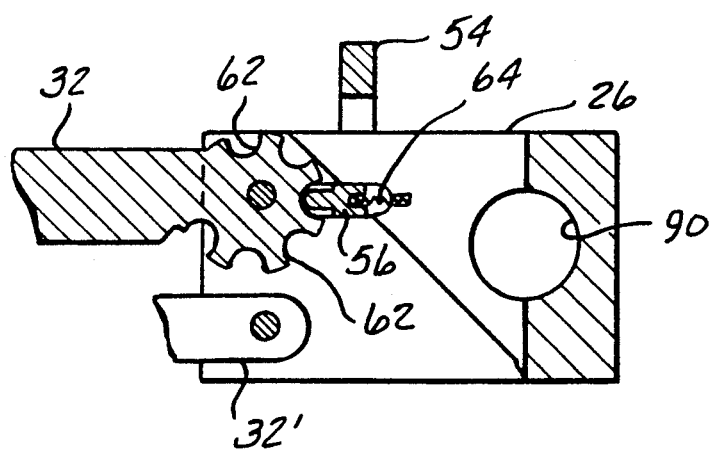
FIG. 4 is a cross sectional side view taken on line 4—4 of FIG. 1.

The adjustable bicycle stem 10 may further comprise means for releasably locking second horizontal member 26 into one of the low, high or intermediate positions, 42, 44, 46, respectively. This releasable locking means may comprise any suitable means, but in the preferred embodiment, as best seen in FIG. 4, this releasable locking means comprises a lever 54 disposed on one of the first and second horizontal members, 24, 26, respectively. As seen in FIGS. 1 and 4, this lever 54 is preferably disposed on second horizontal member 26. Reciprocal key means are operatively attached to lever 54. This key means may comprise any suitable means, but in the preferred embodiment, it comprises a spring loaded pin 56 operatively attached to lever 54 via a projection 58 attached to pin 56 and slidably received within slot 60, with slot 60 being defined in lever 54, as best seen in FIG. 1.

A plurality of radially extending key slots 62 are disposed on an end of pivotable link 32 adjacent lever 54. Upon movement of lever 54 in one direction, toward the right as seen in FIG. 4, the key means will allow free pivoting movement of link 32. Upon movement of lever 54 in an opposite direction, namely toward the left as seen in FIG. 4, the key means will extend into one of the plurality of key slots 62, thereby locking link 32 against further movement. FIG. 4 shows pin 56 extending into a key slot 62 and locking link 32 against pivoting movement. The releasable locking means may further optionally comprise means for biasing the key means into one of the plurality of key slots 62. This key biasing means may comprise any suitable means, however, as shown in FIG. 4, it comprises a spring 64 impinging upon pin 56, thereby urging pin 56 toward one of the plurality of key slots 62. The releasable locking means may still further optionally comprise a cable linkage operatively connected to the locking means.

Adjustable bicycle stem 10 may further comprise means for releasably securing vertical member first end 20 within sleeve 16. This releasable securing means may comprise any suitable and conventional securing means, however, as shown in FIG. 1, this means comprises a through bore 66 extending longitudinally through first horizontal member 24 and a through bore 68 extending longitudinally through vertical member 18. A bolt 70 has a first end 72 and a second end 74, with first end 72 extending through first horizontal member bore 66 and second end 74 extending through vertical member bore 68. Upon tightening of bolt 70, vertical member first end 20 will be tightly and securely fixed within sleeve 16.

Means, attached to bolt second end 74, may optionally be provided for expanding the overall diameter of vertical member 18. The optional expanding means may comprise any suitable means conventionally known to those skilled in the art, however, as seen in FIG. 1, vertical member first end 20 defines a bottom surface having an angularly offset face 76. The expanding means comprises a member 80 having an angular face 78 complementary to the bottom surface angular face 76. Member 80 has a threaded through bore for threading engagement with bolt 70. Upon tightening action of bolt 70, member 80 will slide in an upward and outward direction relative to vertical member 18, thereby occupying any excess diametrical space within sleeve 16 which is not occupied by vertical member 18.

Figure 6:
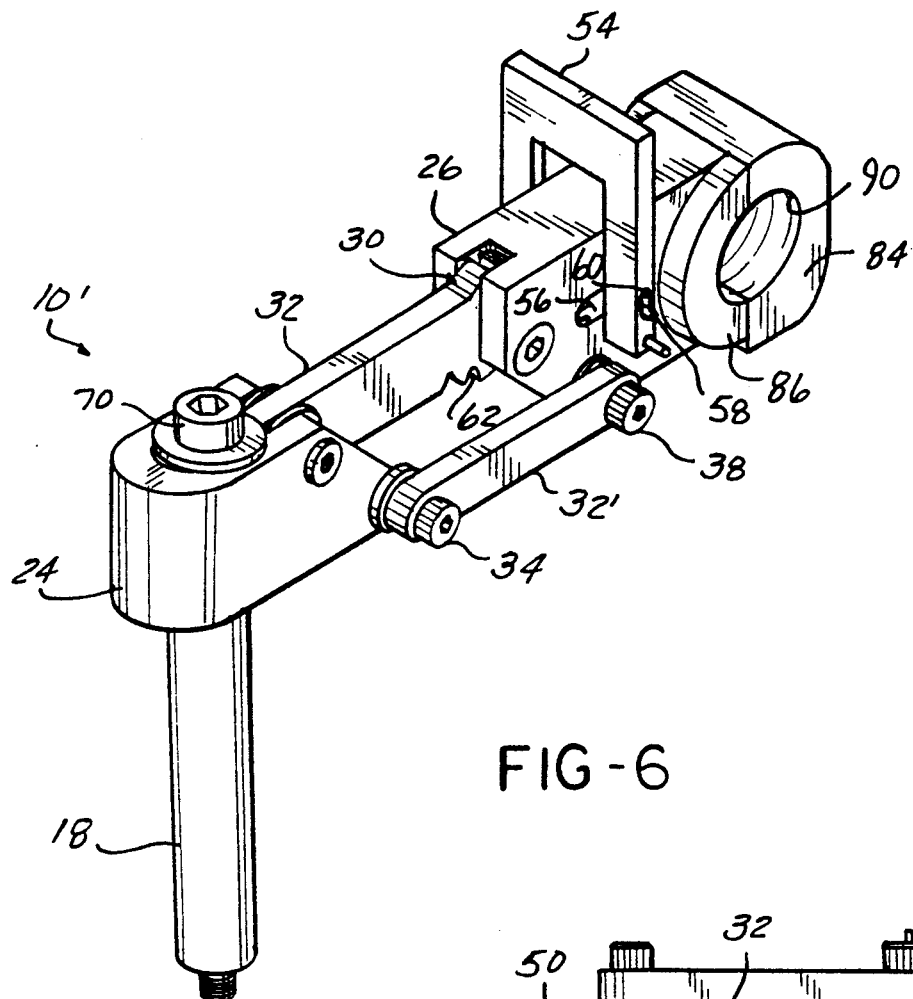
FIG. 6 is a perspective view of a second embodiment of the present invention.
Figure 7:
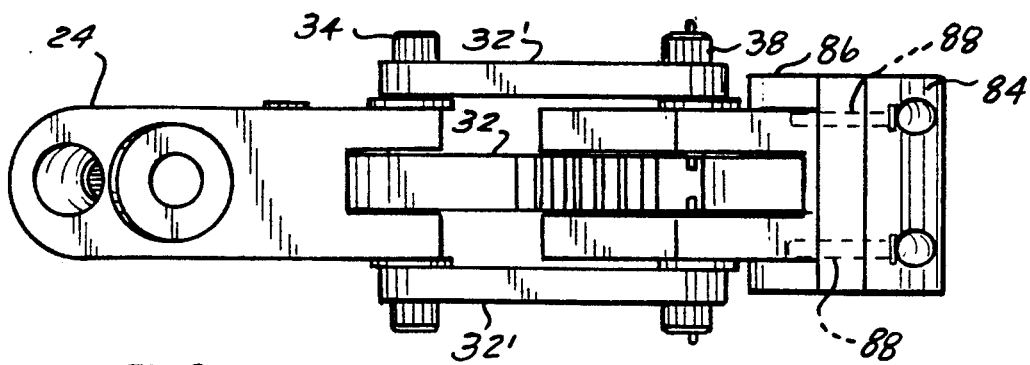
FIG. 7 is a bottom view of the second embodiment.

Adjustable bicycle stem 10 further comprises means for securing handlebar 14 to second horizontal member 26. This handlebar securing means may comprise any suitable and conventionally known securing means. The securing means may either releasably and adjustably secure the handlebar 14, or it may secure it in a semi-permanent or permanent manner, whichever is desired by the manufacturer and/or consumer. As best seen in FIGS. 1, 6 and 7, the drawings depict a semi-permanent securing means. First handlebar securing portion 84 may be secured to second handlebar securing portion 86 by any appropriate and suitable fasteners, such as bolts 88. When first portion 84 is attached to second portion 86, a handlebar securing passage 90 is formed, through which handlebar 14 is secured, as seen in FIG. 2.

FIGS. 6, 7, and 8 show an alternate embodiment of the bicycle stem of the present invention, generally designated as 10'. In this embodiment, only one link 32 ends in the radially extending key slots 62, and this link is positioned to abut second horizontal member 26 near its center, as opposed to the first embodiment, whereby two links 32 terminate in the radially extending key slots 62, with these links being adjacent each side of second horizontal member 26, with third link 32' being in between and lower than the two above-mentioned links. In both embodiments, the links not terminating in the radially extending key slots 62 are designated as 32'.

Referring now to FIG. 5, low position 42 would place handlebar 14 in a position suitable for a touring or racing bike. Position 44 would be suitable for a mountain bike. Intermediate position 46 is one of several optional intermediate positions available which a cyclist can select in order to optimize comfort and control. Any of the positions would be suitable for use on a stationary bike. The adjustable bicycle stem of the present invention adds much versatility to a single bicycle and allows better control and comfort, due to the ability to quickly and easily position handlebar 14 while riding since the releasable locking means may be manipulated without any need for tools or the like. The present invention, in addition to providing all the advantageous results mentioned earlier, may also provide improved aerodynamics and other advantages readily discernable by one skilled in the art.

While preferred embodiments of the invention have been described in detail, it will be apparent to those skilled in the art that the disclosed embodiments may be modified. Therefore, the foregoing description is to be considered exemplary rather than limiting, and the true scope of the invention is that defined in the following claims.

I claim:

1. An adjustable bicycle stem for use on a bicycle having a handlebar and a stem sleeve, the bicycle stem comprising:
   a substantially vertical member having a first end and a second end, the first end being removably receivable within the sleeve;
   a first substantially horizontal member attached to the vertical member second end;
   a second substantially horizontal member pivotably connected to the first horizontal member;
   means for pivoting the second horizontal member with respect to the first horizontal member, wherein the second horizontal member is pivoted about two fixed pivot axes extending perpendicularly through the first horizontal member, and about two pivot axes extending perpendicularly through the second horizontal member, wherein a first substantially vertical distance between the two fixed pivot axes is substantially equal to a second substantially vertical distance between the two pivot axes extending through the second horizontal member; and
   means for securing the handlebar to the second horizontal member.

2. The adjustable bicycle stem as defined in claim 1 wherein the pivoting means comprises:
   a first articulating joint disposed on the first horizontal member;
   a second articulating joint disposed on the second horizontal member; and
   a pivotable link formed between the first and second joints.

3. The adjustable bicycle stem as defined in claim 2 wherein the second horizontal member is movable between a low position, a high position, and positions intermediate the low and high positions, the positions being relative to the first horizontal member, the bicycle stem further comprising means, acting upon the pivotable link, for biasing the second horizontal member into one of the positions.

4. The adjustable bicycle stem as defined in claim 2 wherein the first articulating joint comprises a tenon-mortise joint connected to the first horizontal member by a pin extending along a fixed pivot axis, relative to the vertical member, and wherein the second articulating joint comprises a tenon-mortise joint connected to the second horizontal member by a pin extending along a movable pivot axis, relative to the vertical member.

5. The adjustable bicycle stem as defined in claim 4 wherein three pivotable links are formed between three pairs of first and second tenon-mortise joints.

6. The adjustable bicycle stem as defined in claim 2 wherein the second horizontal member is movable between a low position, a high position, and positions intermediate the low and high positions, the positions being relative to the first horizontal member, and wherein the bicycle stem further comprises means for releasably locking the second horizontal member into one of the positions.

7. The adjustable bicycle stem as defined in claim 1, further comprising means for releasably securing the vertical member first end within the sleeve.

8. The adjustable bicycle stem as defined in claim 7 wherein the vertical member has an overall diameter and wherein the releasable securing means comprises:
   a through bore extending longitudinally through the first horizontal member;
   a through bore extending longitudinally through the vertical member;
   a bolt having a first end and a second end, with the first end extending through the first horizontal member bore and the second end extending through the vertical member bore; and
   means, attached to the bolt second end, for expanding the overall diameter of the vertical member;
   wherein upon tightening of the bolt, the vertical member first end will be tightly and securely fixed within the sleeve.

9. The adjustable bicycle stem as defined in claim 8 wherein the first end of the vertical member defines a bottom surface having an angularly offset face and wherein the expanding means comprises a member having an angular face complementary to the bottom surface angular face, the member having a threaded through bore for threading engagement with the bolt.

10. The adjustable bicycle stem as defined in claim 1 wherein the handlebar securing means releasably and adjustably secures the handlebar.

11. An adjustable bicycle stem for use on a bicycle having a handlebar and a stem sleeve, the bicycle stem comprising:
   a substantially vertical member having a first end and a second end, the first end being removably receivable within the sleeve;
   a first substantially horizontal member attached to the vertical member second end;
   a second substantially horizontal member pivotably connected to the first horizontal member, the second horizontal member being movable between a low position, a high position, and positions intermediate the low and high positions, the positions being relative to the first horizontal member;
   means for pivoting the second horizontal member with respect to the first horizontal member, wherein the pivoting means comprises:
      a first articulating joint disposed on the first horizontal member;
      a second articulating joint disposed on the second horizontal member; and
      a pivotable link formed between the first and second joints;
   means for securing the handlebar to the second horizontal member; and
   means for releasably locking the second horizontal member into one of the positions, wherein the releasable locking means comprises:
      a lever disposed on one of the first and second horizontal members;
      reciprocal key means operatively attached to the lever; and
      a plurality of radially extending key slots disposed on an end of the pivotable link adjacent the lever;
      wherein upon movement of the lever in one direction, the key means will allow free pivoting movement of the link, and upon movement of the lever in an opposite direction, the key means will extend into one of the plurality of key slots, thereby locking the link against further movement.

12. The adjustable bicycle stem as defined in claim 11 wherein the releasable locking means further comprises means for biasing the key means into one of the plurality of key slots.

13. The adjustable bicycle stem as defined in claim 11 wherein the key means comprises a spring loaded pin.

14. The adjustable bicycle stem as defined in claim 11 wherein the lever is disposed on the second horizontal member.

15. An adjustable bicycle stem for use on a bicycle having a handlebar and a stem sleeve, the bicycle stem comprising:
   a substantially vertical member having a first end and a second end, the first end being removably receivable within the sleeve;
   a first substantially horizontal member attached to the vertical member second end;
   a second substantially horizontal member pivotably connected to the first horizontal member, the second horizontal member being movable between a low position, a high position, and positions intermediate the low and high positions, the positions being relative to the first horizontal member;
   means for pivoting the second member with respect to the first member, wherein the second horizontal member is pivoted about two fixed pivot axes extending perpendicularly through the first horizontal member, and about two pivot axes extending perpendicularly through the second horizontal member, wherein a first substantially vertical distance between the two fixed pivot axes is substantially equal to a second substantially vertical distance between the two pivot axes extending through the second horizontal member, and wherein the pivoting means comprises:
      a first articulating joint disposed on the first horizontal member, the first articulating joint comprising a tenon-mortise joint connected to the first horizontal member by a pin extending along a fixed pivot axis, relative to the vertical member;
      a second articulating joint disposed on the second horizontal member, the second articulating joint comprising a tenon-mortise joint connected to the second horizontal member by a pin extending along a movable pivot axis, relative to the vertical member; and
      a pivotable link formed between the first and second joints;
   means for releasably locking the second horizontal member into one of the positions;
   means for securing the handlebar to the second horizontal member; and
   means for releasably securing the vertical member first end within the sleeve.

16. The adjustable bicycle stem as defined in claim 15 wherein three pivotable links are formed between three pairs of first and second tenon-mortise joints.

17. An adjustable bicycle stem for use on a bicycle having a handlebar and a stem sleeve, the bicycle stem comprising:
   a substantially vertical member having a first end and a second end, the first end being removably receivable within the sleeve;
   a first substantially horizontal member attached to the vertical member second end;
   a second substantially horizontal member pivotably connected to the first horizontal member, the second horizontal member being movable between a low position, a high position, and positions intermediate the low and high positions, the positions being relative to the first horizontal member;
   means for pivoting the second member with respect to the first member, wherein the pivoting means comprises:
      a first articulating joint disposed on the first horizontal member, the first articulating joint comprising a tenon-mortise joint connected to the first horizontal member by a pin extending along a fixed pivot axis, relative to the vertical member;
      a second articulating joint disposed on the second horizontal member, the second articulating joint comprising a tenon-mortise joint connected to the second horizontal member by a pin extending along a movable pivot axis, relative to the vertical member; and
      a pivotable link formed between the first and second joints;
   means for releasably locking the second horizontal member into one of the positions, wherein the releasable locking means comprises:
      a lever disposed on one of the first and second horizontal members;
      reciprocal key means comprising a spring loaded pin, operatively attached to the lever; and
      a plurality of radially extending key slots disposed on an end of the pivotable link adjacent the lever;
      wherein upon movement of the lever in one direction, the pin will allow free pivoting movement of the link, and upon movement of the lever in an opposite direction, the pin will extend into one of the plurality of key slots, thereby locking the link against further movement;
   means for securing the handlebar to the second horizontal member; and
   means for releasably securing the vertical member first end within the sleeve.

* * * * *